Jan. 5, 1965  R. D. GEISER  3,163,940
RAPID COMPARATOR
Filed May 29, 1962
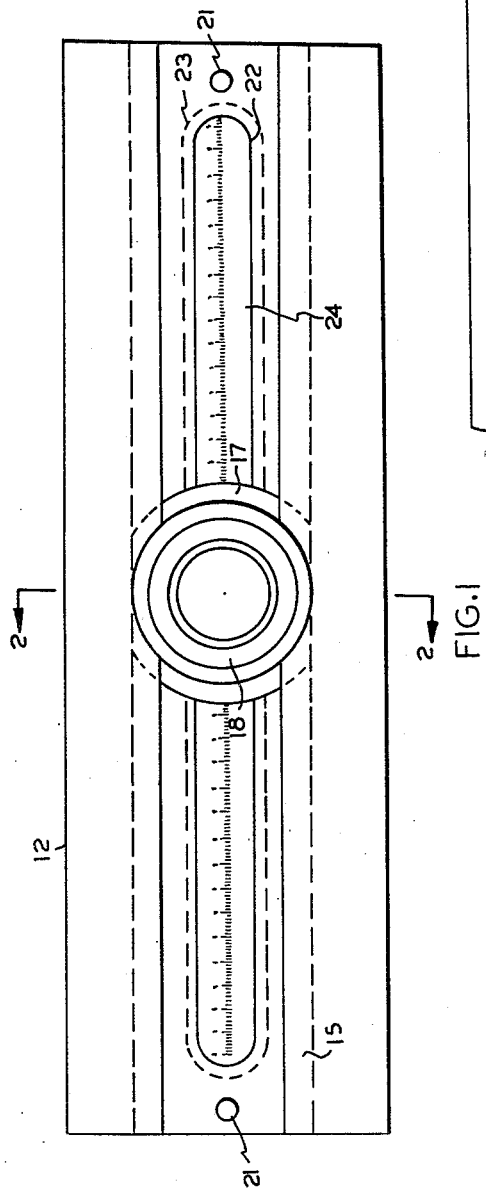
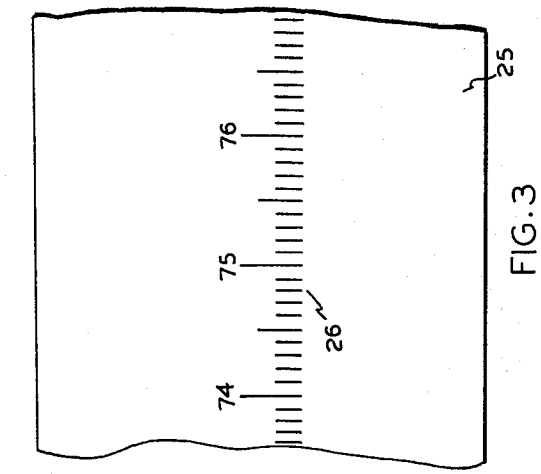
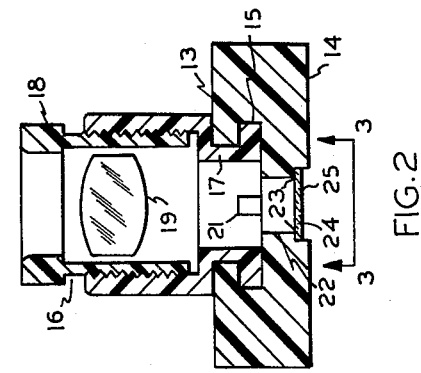
INVENTOR
RALPH D. GEISER
BY *Dodge and Ostmann*
ATTORNEYS

3,163,940
RAPID COMPARATOR

Ralph D. Geiser, Troy, N.Y., assignor to W. & L. E. Gurley, Troy, N.Y., a corporation of New York
Filed May 29, 1962, Ser. No. 198,634
4 Claims. (Cl. 33—107)

This invention relates to a device for measuring relatively short linear distances with high degree of accuracy.

The object of this invention is to provide a compact, durable, portable comparator for the rapid, accurate measurement of short linear distances between two or more identifiable marks whose separation is too great to be viewed simultaneously through an optical aid such as a jeweler's loupe or low-power microscope.

The preferred embodiment of this invention is a comparator having a precise glass scale that carries fine graduation marks accurately spaced at intervals of a few thousandths of an inch and which is recessed from the surface to be measured. To enable easy readability of the scale, the comparator has a magnifying eyepiece adapted to move along the axis of the scale.

The comparator herein set forth can be used for the routine field measurements that are needed in photogrammetry, in toolroom layouts, in shrink testing, in measuring distances on aerial photographic plates in conjunction with the tracking of satellites or in any other scientific or industrial field that requires quick, semi-precise measurements. Of course, it is obvious that this comparator does not have the same degree of accuracy as various heavy, ultra precise toolmaker's microscopes and comparators, but it is far more convenient to use and is sufficiently adequate for quick measurements requiring precision of only a few thousandths of an inch.

The preferred embodiment of the invention will be described in relation to the accompanying drawing, in which:

FIG. 1 is a plan view of the comparator with the scale graduations shown slightly enlarged for the purpose of emphasis.

FIG. 2 is a sectional view taken on line 2—2 of FIG. 1.

FIG. 3 is an enlarged, partial view taken on line 3—3 of FIG. 1. For clarity, the numbers are reversed so that they appear as if the scale is being viewed through the eyepiece.

The rapid comparator of this invention comprises a shock resistant, transparent plastic body 12 that has generally rectangular upper and lower surfaces 13 and 14, respectively. In the upper surface 13, there is a straight inverted T-shaped groove 15, which is spaced from and entered between the relatively long sides of the body 12 and extends through both ends of the body.

The comparator is provided with an optical magnifier 16 having a relatively narrow field of view for viewing the graduations. The lower part 17 of the magnifier 16 is disposed within groove 15 and slides freely therein between a pair of protruding pins 21 fastened adjacent the ends of the body 12. The upper lens-carrying part 18 of the magnifier is adjustably fastened to the part 17 and this adjustable connection allows the user of the comparator to vary the distance between the lens 19 and the lower surface 14 and thus individually adjust the focus of the magnifier 16.

Parts 17 and 18 can be made of any shock-resistant material, as for example, transparent plastic, and, of course, the lens 19 is made of glass. The magnifier 16 can be chosen to afford a magnification of 5 to 20 power.

The lower surface 14 of the body has a slot 22 therein which communicates and is aligned with the groove 15. This slot has a length that is less than the distance between the pins 21 and it is narrower than the T-shaped groove 15. Adjacent the surface 14, the slot 22 is slightly enlarged, thereby forming the shoulder 23. This shoulder completely surrounds the slot 22.

A thin glass plate 24 is removably positioned within the enlarged portion of the slot 22 and is mounted against the shoulder 23. This plate is positioned within the slot 22 so that its lower face 25 is parallel with and recessed from the surface 14. This slight recession, on the order of a thousandth of an inch, is important because it prevents wear and deterioration of the scale; however, it is not enough to cause appreciable parallax errors in reading. Moreover, the glass used to make the plate 24 is selected so that the thermal coefficients of the glass plate 24 and the surface to be measured are approximately equivalent. This avoids any errors due to temperature changes.

The lower face 25 of the plate 24 has a fine graduated scale engraved thereon and this scale, running approximately the entire length of the plate and being centered between the sides thereof, consists of a series of short, thin lines 26 that are spaced from each other in an ordered pattern. These lines are positioned on the face 25 so as to be perpendicular to the direction in which the magnifier 16 slides. For the convenience of the user of the comparator, a series of numerical indicia are associated with a selected number of the lines 26.

As shown in FIG. 3, the length of the lines 26 is short relative to the width of the face 25 so that the lines 26 lie completely within the field of vision of the magnifier 16. In the preferred embodiment, each of the lines 26 has a terminal point which lies on a common straight line (imaginary) that is parallel with the path of travel of the magnifier 16. This arrangement precludes the necessity of engraving an index line extending longitudinally of the scale since this imaginary line defines such an index line.

Of course, it is within the scope of this invention to use two other types of index lines, namely (1) a real index line engraved on the face within the field of vision of the magnifier, and (2) an imaginary index line within the field of view resulting from the fact that the lengths of the lines 26 are so short that they may be considered as points so that the manner of positioning the scale on the print to be measured does not result in a reading whose limit of accuracy differs greatly from the inherent limit of accuracy of the scale itself. Of course, with the real index line (1), it is not necessary that lines 26 terminate with the field of vision of the magnifier.

As stated previously, the drawing and the description relate only to the preferred embodiment of the invention. Since many changes can be made in the structure without departing from the inventive concept, the following claims should provide the sole measure of the scope of the invention.

What I claim is:

1. A measuring instrument comprising
   (a) a transparent body having an upper surface and a planar, lower surface with a slot therein, at least a portion of the slot being spaced from the margins of the lower surface;
   (b) a pair of spaced, parallel guideways carried by the upper surface of the body;
   (c) a slide mounted between the guideways for movement along the upper surface;
   (d) an optical magnifier mounted on the slide for movement therewith and having a narrow field of view relative to the width of the body;
   (e) a transparent insert having upper and lower faces and being secured within the slot so that its lower face is parallel with but slightly recessed from the lower surface of the body; and
   (f) the lower face of the insert being inscribed with a series of evenly spaced marks perpendicular to the guideways and with an index line perpendicular to the marks, portions of the index line and the marks being within the field of view of the magnifier as it moves along the guideways.

2. The instrument as defined in claim 1 in which the terminal points of one end of all the marks lie in a straight, imaginary line that is within the field of vision of the magnifier and this imaginary line can be used as an indexing line.

3. The instrument as defined in claim 1 in which the body and the insert are made of plastic and glass, respectively, and the insert being removable from the slot.

4. The instrument as defined in claim 3 in which the marks and a series of numerical indicia that complement the marks are engraved.

References Cited by the Examiner

UNITED STATES PATENTS

| | | | |
|---|---|---|---|
| 798,721 | 9/05 | Wilson | 33—99 |
| 1,045,695 | 11/12 | Goldwater | 33—99 |
| 1,629,373 | 5/27 | Arms | 33—99 |
| 2,501,550 | 3/50 | Tamagna | 33—1 |
| 2,736,097 | 2/56 | Coleman | 33—107 |
| 3,046,662 | 7/62 | Chabot | 33—76 |

FOREIGN PATENTS

| | | |
|---|---|---|
| 248,230 | 2/48 | Switzerland. |
| 674,961 | 7/52 | Great Britain. |

ISAAC LISANN, *Primary Examiner.*